US012760696B2

(12) United States Patent
Suematsu et al.

(10) Patent No.: US 12,760,696 B2
(45) Date of Patent: Oct. 13, 2026

(54) ELECTRONICALLY CONTROLLED REGULATOR

(71) Applicant: Nikki Co., Ltd., Kanagawa-ken (JP)

(72) Inventors: Yukinori Suematsu, Kanagawa-Ken (JP); Shutaro Aizawa, Kanagawa-ken (JP)

(73) Assignee: Nikki Co., Ltd. (JP)

( * ) Notice: Subject to any disclaimer, the term of this patent is extended or adjusted under 35 U.S.C. 154(b) by 0 days.

(21) Appl. No.: 18/953,064

(22) Filed: Nov. 20, 2024

(65) Prior Publication Data

US 2025/0163871 A1 May 22, 2025

(30) Foreign Application Priority Data

Nov. 20, 2023 (JP) ................................ 2023-196987

(51) Int. Cl.

*F02M 21/02* (2006.01)
*F16H 25/20* (2006.01)
*F16K 27/02* (2006.01)
*F16K 31/04* (2006.01)

(Continued)

(52) U.S. Cl.

CPC ..... *F02M 21/0242* (2013.01); *F16H 25/2003* (2013.01); *F16K 27/02* (2013.01); *F16K 31/046* (2013.01); *F16K 31/047* (2013.01); *F16K 31/50* (2013.01); *G05D 16/202* (2013.01)

(58) Field of Classification Search

CPC . F02M 21/0242; F16H 25/2003; F16K 27/02; F16K 31/046; F16K 31/047; F16K 31/50; G05D 16/202

See application file for complete search history.

(56) References Cited

U.S. PATENT DOCUMENTS 7,095,193 B2 * 8/2006 Kellogg ................. H02K 15/00 318/400.38
7,758,013 B2 * 7/2010 Arai ........................ F16K 31/53 251/85
9,528,624 B2 * 12/2016 Naganuma ............ F16K 31/046

(Continued)

FOREIGN PATENT DOCUMENTS

EP 3273186 A1 1/2018
JP S59160842 U1 10/1984

(Continued)

OTHER PUBLICATIONS

Extended EP Search Report, EP24211740.6, dated Dec. 23, 2024.

*Primary Examiner* — John Bastianelli
(74) *Attorney, Agent, or Firm* — Fishman Stewart PLLC

(57) ABSTRACT

An electronically controlled regulator may include a pressure regulating valve, which may include a discharge pressure regulating unit that adjusts a pressure of a fluid by changing a distance between a valve body and a valve seat while reciprocating a valve shaft by a valve shaft moving structure using a feed screw, a slidable piston that receives a fluid pressure in a discharge pressure chamber, and a spring that constantly biases the valve shaft in a valve closing direction. At the time of valve closing, the fluid pressure received by the piston may be converted into a pressure load in a direction of pressing the valve body, and at a time of pressure adjustment, a positional deviation of the valve shaft due to a backlash provided at a meshing portion of the feed screw may be avoided by a biasing force of the spring.

2 Claims, 4 Drawing Sheets

1A

(51) Int. Cl.

| | |
|---|---|
| ***F16K 31/50*** | (2006.01) |
| ***G05D 16/20*** | (2006.01) |

(56) References Cited

U.S. PATENT DOCUMENTS

| | | | | |
|---|---|---|---|---|
| 2012/0248355 | A1* | 10/2012 | Harada | F16K 31/047<br>251/129.11 |
| 2015/0159566 | A1* | 6/2015 | Akita | F02D 41/003<br>137/488 |
| 2016/0146159 | A1 | 5/2016 | Kimoto | |
| 2022/0214090 | A1* | 7/2022 | Moser | F16K 37/0041 |
| 2023/0384807 | A1 | 11/2023 | Suenaga | |

FOREIGN PATENT DOCUMENTS

| | | | |
|---|---|---|---|
| JP | 3594507 | B2 | 12/2004 |
| JP | 6231404 | B2 | 11/2017 |
| JP | 2023175563 | A | 12/2023 |
| JP | 2024170062 | A | 12/2024 |

* cited by examiner

ELECTRONICALLY CONTROLLED REGULATOR

CROSS-REFERENCE TO RELATED APPLICATIONS

This application claims priority to Japanese Patent Application No. JP 2023-196987, filed on Nov. 20, 2023, the contents of which is hereby incorporated by reference in its entirety.

TECHNICAL FIELD

The present invention relates to a regulator that discharges a high-pressure fluid such as a gas fuel while depressurizing and regulating the fluid to a predetermined pressure, and in particular, to an electronically controlled regulator that regulates a pressure of the fluid to be discharged by electronic control.

BACKGROUND

As a regulator that depressurizes a high-pressure fluid to a predetermined pressure and delivers the depressurized fluid, for example, a gas fuel regulator described in JP 3594507 B2 is well known. The regulator includes a valve shaft coaxially disposed with a valve body and a doughnut-shaped seat portion having a seat face which has a center penetrated by a valve hole and is in close contact with the valve body. The regulator has a structure in which, in a case of a high-pressure fluid such as CNG flowing in from an inlet of a body of the regulator, the valve shaft disposed in a reciprocally slidable manner in an axial direction with the valve body in an open state of the valve body is biased by a pressure regulating spring with the valve body pressed down in close contact with the seat face with a predetermined pressure, and a high-pressure gas fuel is discharged while being depressurized and regulated to a predetermined pressure.

However, in such a conventional depressurization structure of the regulator, it is necessary to prepare the pressure regulating spring in advance for each specified discharge pressure, since a discharge pressure of the fluid due to the regulator mechanically depends on a load of the pressure regulating spring. Further, for a regulator used in a fuel supply system of a vehicle, since the pressure regulating spring is fixed to a specified set height in advance, there is a problem that a discharge pressure range and a flow rate range are mechanically limited because a pressure drop increases in a case where an engine required flow rate is large and the pressure drop decreases in a case where the required flow rate is small.

Meanwhile, JP S59-160842 U has proposed a pressure regulating mechanism including a stepping motor that is pulse-controlled in accordance with an output signal from a pressure sensor disposed in a primary-side diaphragm chamber as a biasing force adjusting unit for adjusting a biasing force of a pressure regulating spring in the primary-side diaphragm chamber in an LPG regulator including the primary-side diaphragm chamber and a secondary-side diaphragm chamber.

Accordingly, with the pressure regulating mechanism including the electronically controlled stepping motor, it is possible to maintain a pressure in the primary-side diaphragm chamber at a desired pressure, by weakening the biasing force of the pressure regulating spring in a case where the pressure in the primary-side diaphragm chamber becomes higher than a preset pressure, and strengthening the biasing force of the pressure regulating spring in a case where the pressure in the primary-side diaphragm chamber becomes lower than the preset pressure.

However, only an inner portion of the primary-side diaphragm chamber can be adjusted to and maintained at a desired pressure by the electronically controlled regulator, and a pressure of a fuel discharged from the secondary-side diaphragm chamber depends on the pressure regulating spring arranged in the chamber. Therefore, it is still difficult to set various discharge pressures by one type of regulator, and the problem that the discharge pressure range and the flow rate range are mechanically limited has not been solved.

Therefore, the inventors and applicants of the present application have previously proposed a regulator that electronically controls an electric motor as shown in FIG. 5 in Japanese Patent Application No. 2022-088066. An electronically controlled regulator 1C includes, inside a columnar body 10C, a high-pressure fluid chamber 2C including from an introduction port of a fluid introduction path 11 for introducing a high-pressure fluid to a valve portion of a pressure regulating valve 20C, a discharge pressure chamber 3C including from the valve portion to a discharge port of a fluid delivery path 12 for discharging a depressurized fluid, and a pressure regulating portion 4C as a discharge pressure regulating unit for depressurizing and regulating a pressure of the fluid to be discharged while operating the pressure regulating valve 20C to a predetermined pressure.

Further, the discharge pressure regulating unit constitutes a valve shaft moving structure that moves a cylindrical valve shaft 21C in the axial direction while operating by driving of an electric motor 30C to change a distance between a valve body 22C and a valve seat 23C, and opens and closes the pressure regulating valve 20C to maintain a pressure of the depressurized fluid at a set pressure while operating the valve shaft moving structure by the electric motor 30C based on a value of a pressure sensor that detects the pressure of the depressurized fluid.

As described above, a manner is adopted to maintain a set discharge pressure through an opening and closing operation of the valve body 22C disposed on the valve shaft 21C while driving and controlling the electric motor 30C based on a discharge pressure detected by the sensor without regulating the discharge pressure only by a spring 25C disposed on the distal end side of the valve shaft 21C. Thus, a function of automatically maintaining the set various discharge pressures while flexibly responding to the fluctuation of the required flow rate is exhibited.

However, in such an electronically controlled regulator 1C, during valve closing when energization of the electric motor 30C is stopped such as when an engine is stopped, a load for operating the valve body 22C in a closing direction becomes only the biasing force of the spring 25C disposed on the valve shaft 21C, and a pressing force to the seat face 24C of the valve seat 23C is reduced. Therefore, there is a problem that slow leakage is likely to occur from that portion. Further, in a case where a relationship of an outer peripheral seal diameter (Dp) of the valve shaft 21C being smaller than a seat diameter (Ds) of the valve seat 23C is satisfied, if the slow leakage occurs on the discharge pressure chamber 3C side via the pressure regulating valve 20C, the load acting in a valve opening direction increases, and the fluid is more likely to leak.

Therefore, the inventors and applicants of the present application have proposed, in Japanese Patent Application No. 2023-087018, in addition to the configuration of the electronically controlled regulator 1C described above, an electronically controlled regulator 1B in which a fluid pressure received by a piston 37B is converted into a pressure load in a direction of pressing a valve body 22B against a seat face 24B of a valve seat 23B at the time of closing the valve when the driving of an electric motor 30B is stopped, as a cylindrical space is formed on a discharge pressure chamber 3B side as illustrated in FIG. 4, and the piston 37B receiving the fluid pressure in the discharge pressure chamber 3B is slidably arranged in the space together with a valve shaft 21B in a state of being fixed to the outer peripheral side of the valve shaft 21B, and the above-described slow leakage can be reduced.

However, also in the electronically controlled regulator 1B, in order to prevent galling when a trapezoidal male screw 61 provided on the outer peripheral surface of the valve shaft 21B and a trapezoidal female screw 62 provided on the inner peripheral surface of a rotor 31B, constituting a feed screw 60 of the valve shaft moving structure, mesh with each other, a backlash X (play) is provided between the screw threads as illustrated in FIG. 2 in which the feed screw 60 portion is enlarged. At the time of pressure adjustment, the valve shaft 21B and the valve body 22B shift by the backlash X as illustrated in FIG. 3 according to the pressure balance between a high-pressure fuel chamber 2B at the fuel inlet and a low-pressure fuel chamber 3B on the discharge side, and as a result of this change in the opening area, there is a problem that the discharge pressure suddenly fluctuates.

SUMMARY

The present invention is to solve the above problems, and an object of the present invention is to provide an electronically controlled regulator capable of preventing occurrence of slow leakage via a pressure regulating valve when a valve is closed and avoiding fluctuation in discharge pressure caused by backlash provided in a valve shaft moving structure.

In view of the above, the present invention provides an electronically controlled regulator including, inside a body formed with an introduction port and a discharge port, a pressure regulating valve including, a valve shaft in which a valve body is coaxially provided and capable of reciprocating in an axial direction, a valve seat having a seat face with which the valve body can be brought into close contact on a high-pressure fluid chamber side following the introduction port, and a discharge pressure regulating unit that adjusts a pressure of a fluid by changing a distance between the valve body and the valve seat while driving an electronically controlled electric motor to reciprocate the valve shaft by a valve shaft moving structure including a feed screw provided between an outer peripheral surface of the valve shaft and an inner peripheral surface of a rotor, in which the electronically controlled regulator discharges a high-pressure fluid introduced from the introduction port into the high-pressure fluid chamber from the discharge port as a pressure-reducing fluid having a set pressure on a discharge pressure chamber side while depressurizing and adjusting the high-pressure fluid by the pressure regulating valve, wherein a cylindrical space is formed in the discharge pressure chamber and a piston that receives fluid pressure in the discharge pressure chamber is slidably disposed in the space together with the valve shaft in a state where the piston is fixed to an outer peripheral side of the valve shaft, a spring that constantly biases the valve shaft in a valve closing direction while bringing a distal end side into contact with the piston is disposed in the space, a fluid pressure received by the piston is converted into a pressure load in a direction of pressing the valve body against the seat face at the time of closing the valve when the electric motor is stopped, and occurrence of a positional deviation of the valve shaft due to a backlash provided in a meshing portion of the feed screw is avoided by a biasing force of the spring at the time of pressure regulation.

As described above, by providing the piston that prevents slow leakage while receiving the fluid pressure in the discharge pressure chamber and pressing the valve body against the seat face when the electric motor is stopped, and providing the spring that constantly biases the piston and the valve shaft in the valve closing direction on the discharge pressure chamber side, the positional deviation corresponding to the backlash provided in the valve shaft moving structure between the electric motor and the valve shaft does not occur in the valve shaft, so that it is possible to effectively avoid the sudden fluctuation of the discharge pressure generated by changing the valve opening area due to the positional deviation of the valve shaft according to the pressure balance between a high-pressure fuel chamber and a low-pressure fuel chamber.

In addition, in this electronically controlled regulator, the electric motor is an AC servomotor or a DC brushless motor, and the valve shaft moving structure is a feed screw formed by a combination of a trapezoidal male screw formed on an outer peripheral surface of a motion shaft having a columnar shape coaxially attached to the valve shaft and a trapezoidal female screw formed on the inner peripheral surface of the rotor and meshing with the trapezoidal male screw, and when the trapezoidal female screw rotates around the trapezoidal male screw by driving the electric motor to move the valve shaft while operating the trapezoidal male screw in the axial direction without rotating the trapezoidal male screw, the valve shaft can be moved to a valve opening position or a valve closing position in a short time without excessively enlarging the body and can be accurately stopped.

Furthermore, in the electronically controlled regulator described above, the valve shaft is formed of a cylindrical member in which an annular valve body is coaxially provided and which has a passage through which a fluid can pass, and when the valve body on a distal end side is operated by the discharge pressure regulating unit so as to change the distance to the seat face of the valve seat to adjust the discharge pressure of the fluid, the above-described function can be reliably exerted with a relatively simple configuration.

According to the present invention in which the piston that presses the valve body against the seat face when the electric motor is stopped is constantly biased in the valve closing direction by the spring, it is possible to prevent the occurrence of slow leakage via the pressure regulating valve when the motor is stopped and to avoid the fluctuation of the discharge pressure derived from the backlash provided in the valve shaft moving structure.

DETAILED DESCRIPTION

Hereinafter, an embodiment of the present invention will be described with reference to the drawings.

Figure 1:
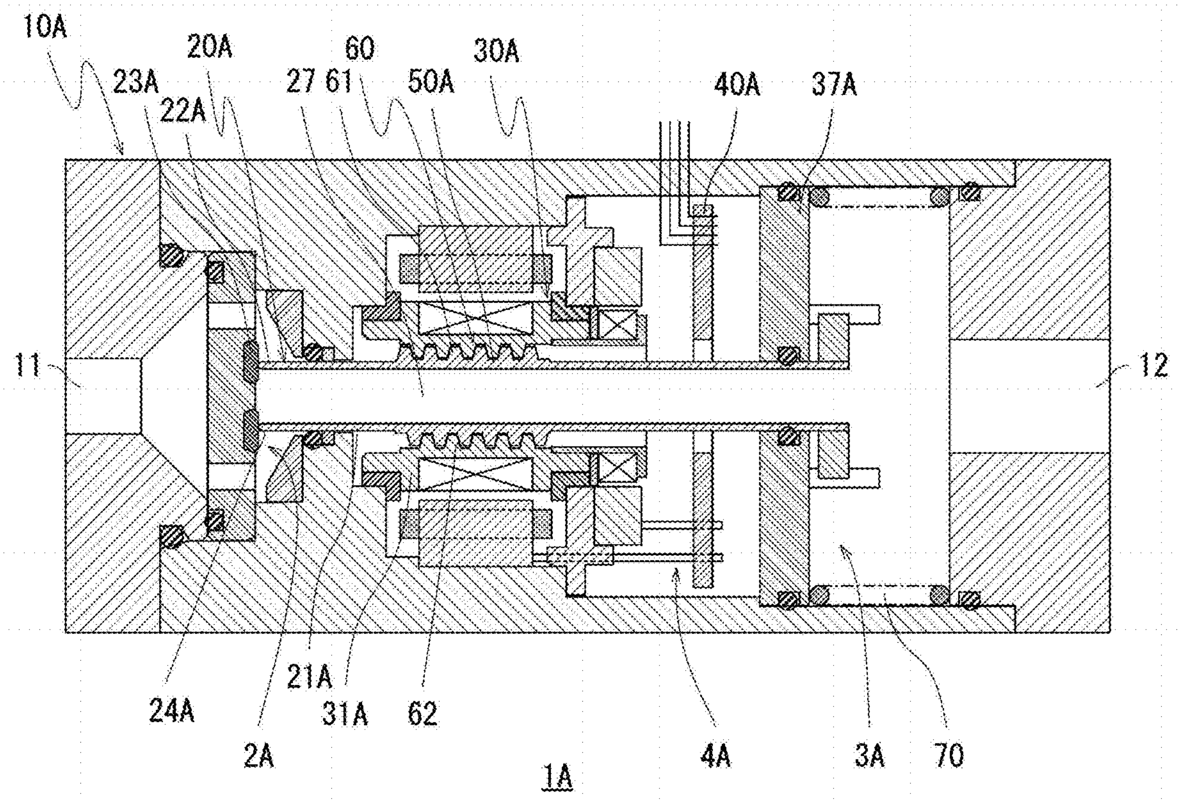
FIG. 1 is a longitudinal sectional view illustrating an electronically controlled regulator according to an embodiment of the present invention.

FIG. 1 illustrates a valve closed state of an electronically controlled regulator 1A according to an embodiment of the present invention. The electronically controlled regulator 1A is assumed to be used as a depressurizing unit that delivers a gas fuel or the like which is a high-pressure fluid, while depressurizing the gas fuel to a predetermined pressure mainly in a supply system for the gas fuel or the like.

A configuration of the electronically controlled regulator will be roughly described. A body 10A made of metal and formed in a columnar shape includes a high-pressure fluid chamber 2A constituting a high-pressure portion from an introduction port of a fluid introduction path 11 for introducing a high-pressure fluid to a valve portion of a pressure regulating valve 20A, a discharge pressure chamber 3A constituting a discharge pressure portion from a valve portion of the pressure regulating valve 20A to a discharge port of a fluid delivery path 12 for discharging the depressurized and regulated fluid, and a pressure control unit 4A including a discharge pressure regulating unit for regulating and maintaining a pressure of the fluid to be discharged.

The pressure regulating valve 20A includes a valve shaft 21A in which an annular valve body 22A is coaxially provided and which is formed of a cylindrical member which has a passage 27 through which a fluid can pass and arranged to be able to reciprocate in the axial direction, a doughnut-shaped valve seat 23A that has a seat face 24A capable of being in close contact with the valve body 22A, in which a valve hole is formed at the center, and a discharge pressure regulating unit that regulates a discharge pressure by causing the valve shaft 21A to reciprocate to change a distance between the valve body 22A and the valve seat 23A.

The discharge pressure regulating unit includes an electric motor 30A including a rotor 31A, a driver 40A that drives and controls the electric motor, and a drive shaft 50A coaxially connected to the valve shaft 21A. The discharge pressure regulating unit drives the valve body 22A on the distal end side of the valve shaft 21A by the electric motor 30A electronically controlled with respect to the seat face 24A of the valve seat 23A, and automatically adjusts the pressure of the depressurized fluid to be discharged to be equal to a set pressure while reciprocating and sliding the valve shaft in an axial direction between a valve closing position where the valve body 22A and the seat face 24A are in close contact with each other and a valve opening position where the valve body 22A and the seat face 24A are separated from each other to change an opening area through a valve shaft moving structure by a feed screw 60 provided between an outer peripheral surface of the valve shaft 21A and an inner peripheral surface of the rotor 31A.

That is, a manner of regulating and maintaining the discharge pressure at a set discharge pressure by performing opening and closing of the valve body 22A provided on the valve shaft 21A and adjustment of the valve opening position while driving and controlling the electric motor 30A based on data of the discharge pressure detected by the pressure sensor (not illustrated) is adopted, and it is possible to automatically maintain the various set discharge pressures while flexibly responding to the fluctuation of the required flow rate. The electric motor 30A is preferably an AC servomotor or a DC brushless motor from the viewpoint of adjustability.

In the electronically controlled regulator 1A of the present embodiment, a cylindrical space is formed in the discharge pressure chamber 3A on the proximal end side of the valve shaft 21A in the body 10A, and the piston 37A that receives the fluid pressure in the discharge pressure chamber 3A is slidably disposed in the space together with the valve shaft 21A in a state of being fixed to the outer peripheral side of the valve shaft 21A.

As a result, when the electric motor 30A is stopped and the valve is closed, the fluid pressure on the discharge pressure chamber 3A side received by the piston 37A is converted into a pressure load in a direction of pressing the valve body 22A against the seat face 24A, so that it is possible to prevent occurrence of a slow leakage via the pressure regulating valve 20A caused by a decrease in the pressing force of the valve seat 23A against the seat face 24A.

Figure 2:
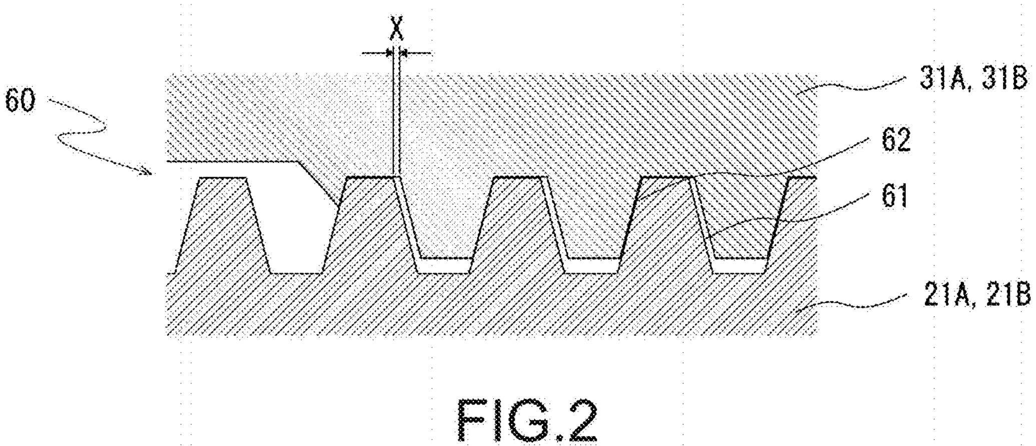
FIG. 2 is an enlarged partial view illustrating a backlash provided in a feed screw of the electronically controlled regulator in FIGS. 1 and 4.
Figure 3:
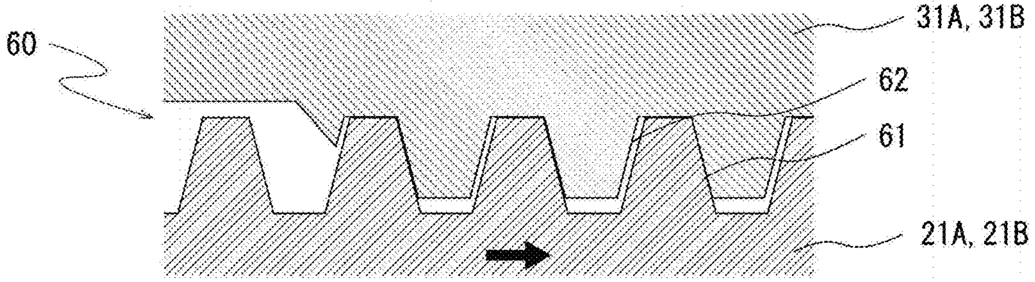
FIG. 3 is an enlarged partial view illustrating a state in which a valve shaft is moved in a valve opening direction (black arrow direction) for the backlash in FIG. 2.
Figure 4:
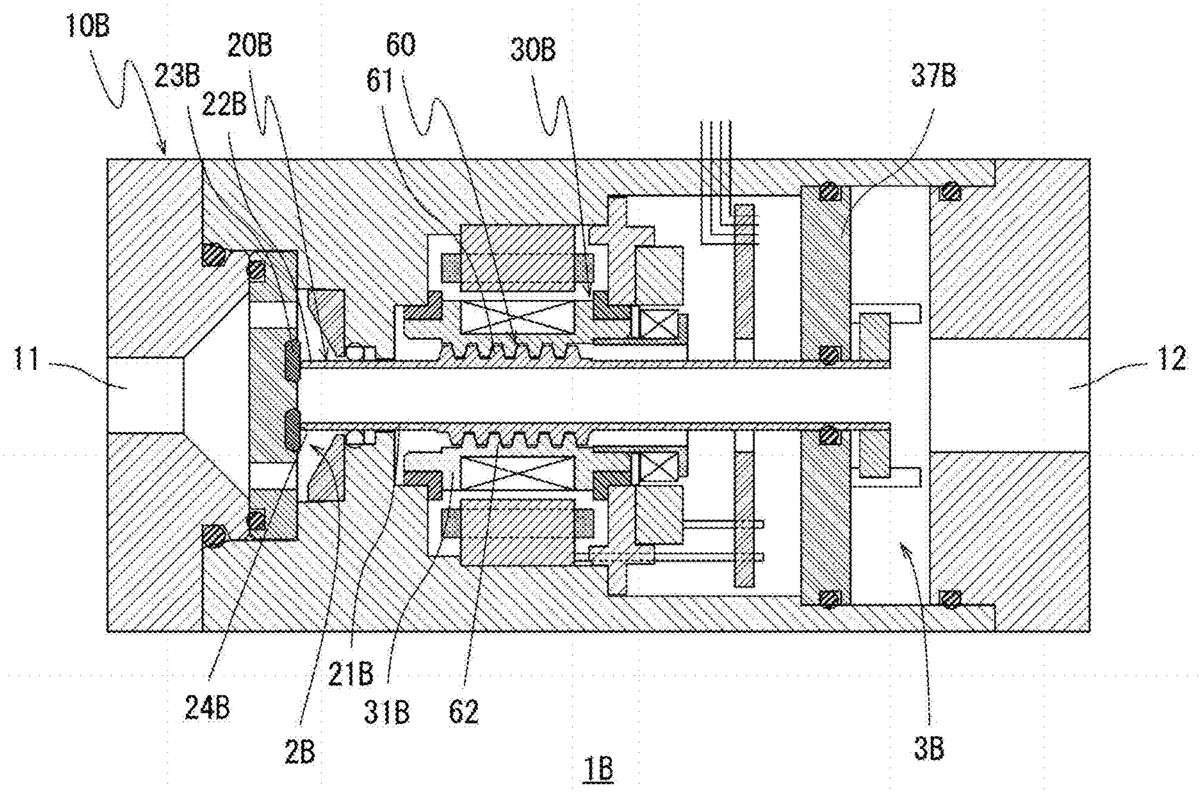
FIG.4 Prior Art
FIG. 4 is a longitudinal sectional view illustrating an electronically controlled regulator of a conventional example.
Figure 5:
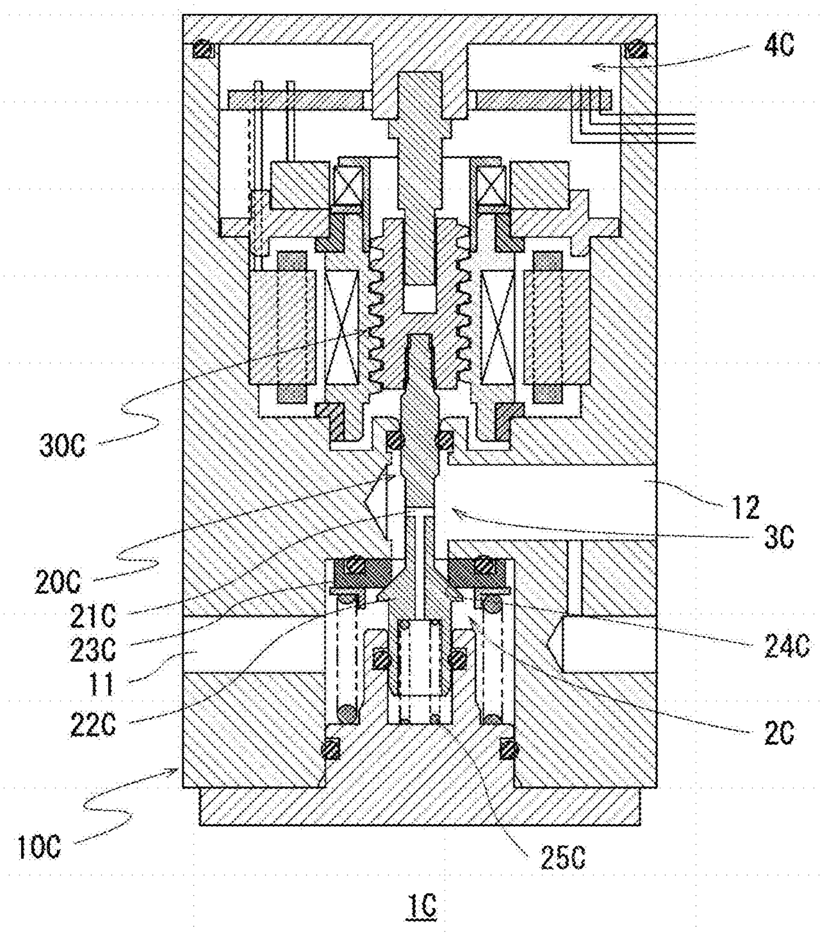
FIG.5 Prior Art
FIG. 5 is a longitudinal sectional view illustrating an electronically controlled regulator of another conventional example.

On the other hand, in the above-described conventional electronically controlled regulator 1B, since the feed screw 60 constituting the valve shaft moving structure is provided with the backlash (play) X between the screw threads so that galling does not occur when the trapezoidal female screw 62 and the trapezoidal male screw 61 are meshed with each other as illustrated in FIG. 2, there is a problem that the pressure regulating valve 20B is moved by the backlash X in accordance with the pressure balance between the high-pressure fluid chamber 2B and the discharge pressure chamber 3B at the time of pressure regulation, and the valve opening area is changed, causing sudden fluctuation in the discharge pressure. The same problem is assumed in the electronically controlled regulator 1A of the present embodiment, similarly since the feed screw 60 is provided with the backlash.

Therefore, in the present embodiment, in the space on the discharge pressure chamber 3A side where the piston 37A is disposed, the spring 70 is disposed in a compressed state so as to constantly bias the valve shaft 21A in the valve closing direction while bringing the distal end side into contact with the pressure receiving surface side of the piston 37A, and this is a feature of the present invention.

As a result, the biasing force of the spring 70 is applied to the piston 37A, so that the trapezoidal female screw 62 and the trapezoidal male screw 61 constituting the feed screw 60 do not shift in the axial direction from the state of being constantly in close contact with each other, and the valve shaft 21A can be prevented from causing positional deviation by the backlash X previously provided to the feed screw 60, so that it is possible to avoid a sudden fluctuation in the discharge pressure caused according to the pressure balance between the high-pressure fluid chamber 2A and the discharge pressure chamber 3A.

As described above, regarding the electronically controlled regulator, according to the present invention, it is possible to prevent occurrence of slow leakage via the pressure regulating valve when the valve is closed, and to avoid fluctuation of the discharge pressure derived from a backlash provided in the valve shaft moving structure.

What is claimed is:

1. An electronically controlled regulator, comprising, inside a body including an introduction port and a discharge port, a pressure regulating valve including:

a valve shaft in which a valve body is coaxially arranged, the valve shaft moveable in a reciprocating manner in an axial direction;

a valve seat having a seat face with which the valve body is adjustable into close contact on a high-pressure fluid chamber side following the introduction port; and a discharge pressure regulating unit that adjusts a pressure of a fluid by changing a distance between the valve body and the valve seat while driving an electronically controlled electric motor to reciprocate the valve shaft via a valve shaft moving structure including a feed screw disposed between an outer peripheral surface of the valve shaft and an inner peripheral surface of a rotor, in which the electronically controlled regulator discharges a high-pressure fluid introduced from the introduction port into a high-pressure fluid chamber from the discharge port as a pressure-reducing fluid having a set pressure on a discharge pressure chamber side while depressurizing and adjusting the high-pressure fluid via the pressure regulating valve;

wherein the valve body is an annular valve body;

wherein the valve shaft is formed of a cylindrical member in which the annular valve body is coaxially arranged and which has a passage through which a fluid is passable;

wherein a discharge pressure of the fluid is adjusted via operating the valve body on a distal end side via the discharge pressure regulating unit to change the distance between the valve body and the seat face;

wherein a cylindrical space is formed in a discharge pressure chamber and a piston that receives fluid pressure in the discharge pressure chamber is slidably disposed in the cylindrical space together with the valve shaft in a state where the piston is fixed to an outer peripheral side of the valve shaft;

wherein a spring is disposed in the cylindrical space, the spring constantly biasing the valve shaft in a valve closing direction while bringing a distal end side into contact with the piston;

wherein a fluid pressure received by the piston is converted into a pressure load in a direction of pressing the valve body against the seat face at a time of closing the valve when the electric motor is stopped; and wherein occurrence of a positional deviation of the valve shaft due to a backlash provided in a meshing portion of the feed screw is avoided via a biasing force of the spring at a time of pressure regulation.

2. The electronically controlled regulator according to claim 1, wherein:

the electric motor is one of an AC servomotor and a DC brushless motor;

the valve shaft moving structure is the feed screw, which is formed by a combination of i) a trapezoidal male screw formed on an outer peripheral surface of a columnar motion shaft coaxially attached to the valve shaft and ii) a trapezoidal female screw formed on the inner peripheral surface of the rotor and meshing with the trapezoidal male screw; and the trapezoidal female screw rotates around the trapezoidal male screw via driving of the electric motor to move the valve shaft while operating the trapezoidal male screw in the axial direction without rotating the trapezoidal male screw.

* * * * *